United States Patent [19]

Fleischer

[11] 4,402,995

[45] Sep. 6, 1983

[54] TREATMENT OF LITHIUM ANODES

[75] Inventor: Niles A. Fleischer, Madison, Wis.

[73] Assignee: Ray-O-Vac Corporation, Madison, Wis.

[21] Appl. No.: 343,490

[22] Filed: Jan. 28, 1982

[51] Int. Cl.$^3$ .............................................. B05D 5/12
[52] U.S. Cl. .................................. 427/58; 427/126.1; 429/101; 429/212
[58] Field of Search ................. 429/194, 50, 196, 218, 429/48, 101; 427/115, 58, 126.1

[56] References Cited

U.S. PATENT DOCUMENTS 4,002,492  1/1977  Rao ..................................... 429/218
4,170,693  10/1979  Catanzarite ........................... 429/48

Primary Examiner—Donald L. Walton
Assistant Examiner—Stephen J. Kalafut
Attorney, Agent, or Firm—Ewan C. MacQueen; Edward A. Steen; Raymond J. Kenny

[57] ABSTRACT

A method for reducing passivation of a lithium anode used in a cell having a liquid thionyl chloride cathode is disclosed, characterized in that the anode is coated before the assembly of the cell with a solution of an alkyl 2-cyanoacrylate, a solvent, and lithium perchlorate.

2 Claims, 2 Drawing Figures

—COMPARISON OF THICK AND SALT ADDED CYANOACRYLATE ONE DAY IN ELECTROLYTE.

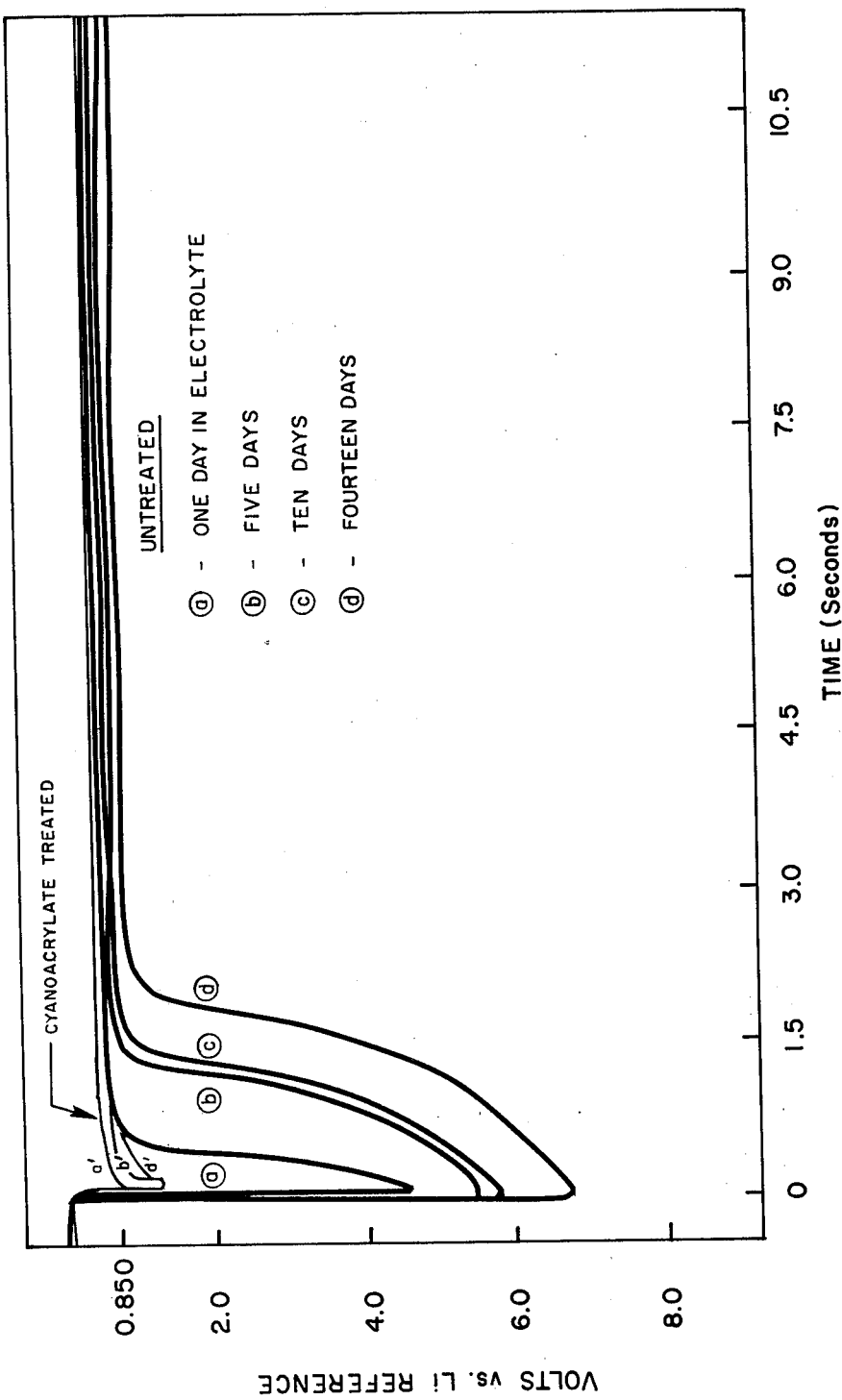
FIGURE 1 - VOLTAGE DELAY OF Li ANODES IN 1.6M $LiAlCl_4$, $SOCl_2$ 6 $mA/cm^2$

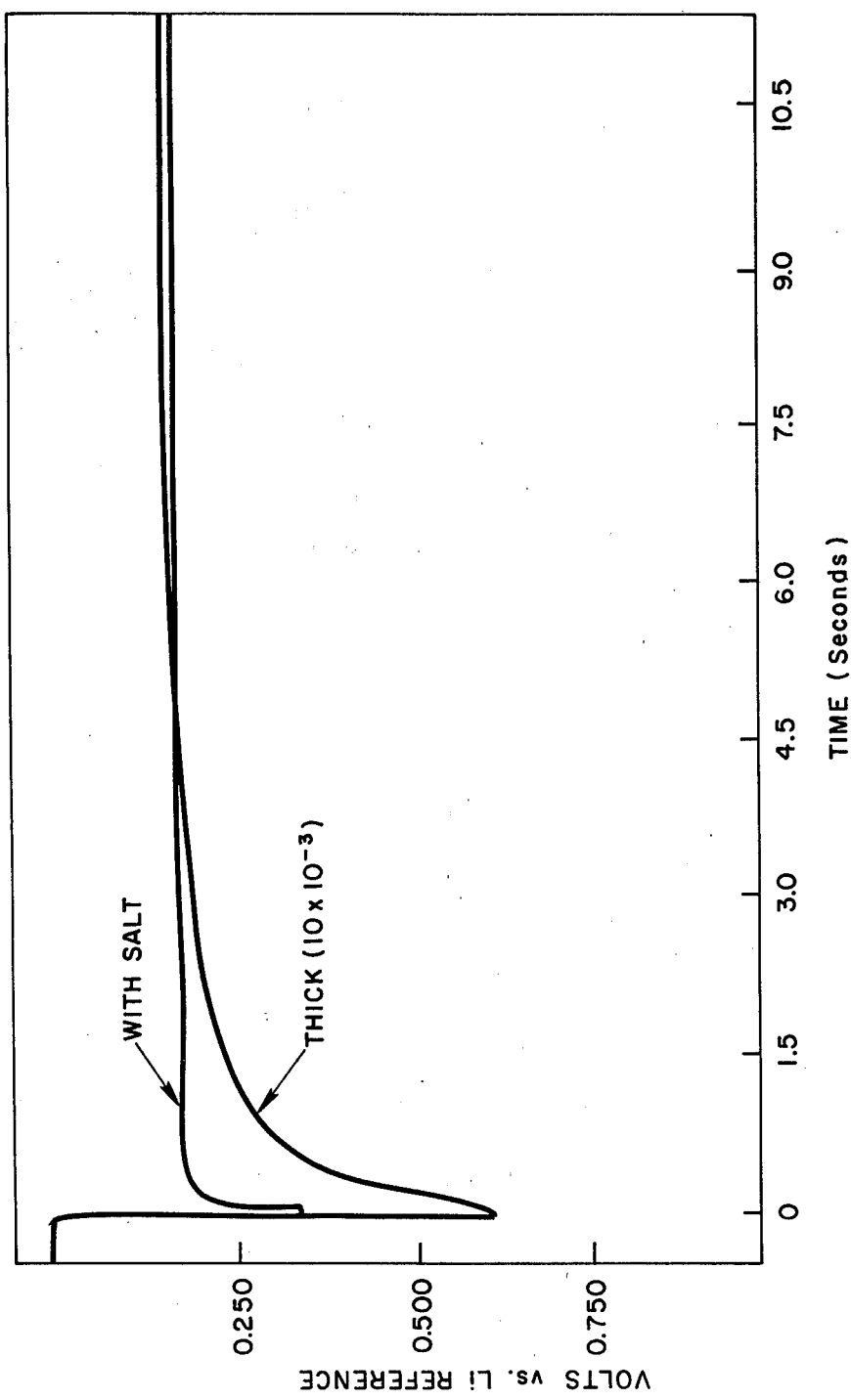
FIGURE 2 - COMPARISON OF THICK AND SALT ADDED CYANOACRYLATE ONE DAY IN ELECTROLYTE.

TREATMENT OF LITHIUM ANODES

The present invention is directed to a method for reducing voltage delay encountered in, for example, lithiumthionyl chloride cells.

BACKGROUND OF THE INVENTION AND THE PRIOR ART

It is known in the art that electrochemical cells having an anode of lithium or other Group I metal have high energy densities, high voltages, wide temperature operating ranges, long shelf-life and relatively low cost.

In such cells, the type now commonly referred to as the "liquid cathode" cell are of particular interest. These cells are described, for example in U.S. Pat. No. 3,926,669 and in British Pat. No. 1,409,307. In accordance with the teachings of the aforementioned patents, the electrolyte comprises an oxyhalide, for example thionyl chloride.

One attractive system is provided through the use of thionyl chloride, a solute of lithium aluminum tetrachloride, a lithium anode and a cathode current collector, which may be for example compressed carbon black. Despite the numerous advantages envisioned for lithium liquid cathode batteries, it has been found that problems occur with these cells. A particular problem has been identified as that of voltage delay particularly occurring when the batteries are stored at elevated temperatures. The voltage delay problem is characterized by two features; to wit, a dip in voltage below a defined cutoff voltage and the time required for the voltage to rise back to the cutoff voltage. The problem is believed to result from passivation of the lithium anode due apparently to reactions between the lithium anode and constituents of the electrolyte.

In accordance with U.S. Pat. No. 4,170,693 it is proposed to minimize the voltage delay problem by coating the lithium anode with a cyanoacrylate polymeric coating.

SUMMARY OF THE INVENTION

The invention is directed to an improvement in the reduction of voltage delay of a lithium oxyhalide cell wherein the lithium is coated with a solution of cyanoacrylate containing a salt together with a solvent for the cyanocrylate in which the salt is also soluble.

DESCRIPTION OF THE DRAWING

FIG. 1 illustrates voltage delay curves determined on half cells using lithium anodes in a thionyl chloride solution of lithium aluminum tetrachloride after exposure of lithium to the electrolyte for various time periods and also includes curves showing the voltage delay resulting from cyanoacrylate treatments of the lithium.

FIG. 2 illustrates a comparison of the voltage delay curve of a lithium anode protected in accordance with the invention as compared to a prior art method.

DETAILED DESCRIPTION OF THE INVENTION

In accordance with the invention a lithium anode is protected by a polymeric film made by dissolving a cyanoacrylate in a solvent and including in the mixture a salt which is soluble in the solvent.

The preferred protective mixture provided in accordance with the invention comprises a solution of the cyanoacrylate with an effective amount of lithium perchlorate dissolved therein. The solvents which may be used in accordance with the invention include ethylacetate, dimethoxyethane and toluene. Lithium perchlorate may be present in the solution in a concentration of about 0.4 molar to saturation, e.g. about 3 molar. Preferably the ratio of cyanoacrylate to solvent is about 1:5 by volume. Volume ratios from 1:6 to 1:2 are operable. The polymeric solution may be applied to the lithium electrode by dipping, spraying, painting, etc. No surface preparation of the lithium is required and the solvent evaporates quickly, leaving behind a polymeric film of cyanoacrylate.

In order to demonstrate the advantages resulting from the invention, a series of half cell tests were made in which a lithium anode was exposed to a thionyl chloride electrolyte containing lithium aluminum tetrachloride in a concentration of 1.6 molar. A constant current of 6 mA/cm$^2$ was applied to the anode and the change in the anode voltage was monitored over time against a lithium reference electrode. A voltage of 850 millivolts was used as a cutoff voltage.

In FIG. 1 of the drawing are shown the voltage curves obtained in the cases of lithium electrodes which were exposed 1 day, 5 days, 10 days and 14 days to the electrolyte. It is to be seen that the voltage delay of the untreated lithium anode became deeper and longer lasting as the exposure time to the electrolyte increased. The experiments were repeated using lithium anodes which were coated with cyanoacrylate dissolved at a 1:3 volume ratio in ethylacetate solvent. The voltage delay curves for these electrodes are also shown in FIG. 1 as curves a', b' and d'. It is to be seen that the voltage delay is greatly alleviated by the cyanoacrylate coating.

An electrode produced in accordance with the invention wherein the lithium was coated with a 1:3 cyanoacrylate/ ethylacetate solution containing lithium perchlorate in a 1 molar concentration was also prepared and the voltage delay curve for this electrode is compared to the voltage delay curve for an electrode coated only with the cyanoacrylate film in FIG. 2. It is to be seen from FIG. 2 that the addition of the lithium perchlorate salt to the film produced the benefit of a lower voltage dip and a much quicker voltage recovery time. In this connection, the recovery time is defined as a time required for the voltage to reach a steady state level. The data comparing voltage delay for cyanoacrylate films without and with the lithium perchlorate addition are summarized in the following Table I:

TABLE I

|  | Voltage Dip | Improvement Over Preceding Method | Recovery Time Seconds |
|---|---|---|---|
| Not Coated | 1.695V | — | — |
| Thin Coating (5 × 10$^{-3}$ mm) | 1.020 | 40% | — |
| Thick Coating (10 × 10$^{-3}$ mm) | 0.625 | 39% | 20 |
| Thick Plus Salt | 0.370 | 41% | 0.5 |

In other half-cell testing in a thionyl chloride electrolyte with 1.6 molar LiAlCl$_4$ therein, it was observed that a 1:5 ratio of cyanoacrylate to ethyl acetate (EtOAc) solvent containing lithium perchlorate in 3 molar concentration (applied by dipping, 15-second immersion per dip) provided superior results as will be seen from the following Table II:

TABLE II

Vmin vs. Li Reference
Half-cell Data, 6 mA/cm² Pulse
Average Values of N Cells

| Coating Composition | Day 1 | Day 1 + 3 | N |
| --- | --- | --- | --- |
| 1:5, 3M LiClO₄ | 0.308 | 0.500 | 3 |
| 1:3, 1M LiClO₄ | 0.380 | 1.318 | 2 |
| 1:3, 3M LiClO₄ | 0.475 | — | 3 |
| 1:3, 0.45M LiClO₄ | 0.420 | 0.725 | 1 |
| 1:5, 3M LiClO₄, two coatings | 1.923 | — | 2 |

Coin cells having a rating of about 1.5 ampere hours produced using cyanoacrylate coated lithium electrodes with and without lithium perchlorate salt addition, a thionyl chloride electrolyte containing LiAlCl₄ and a porous carbon cathode collector also demonstrated an improvement in relation to voltage delay as shown in the following Table III:

TABLE III

VOLTAGE DELAY DATA/TIME
TO 2.7v, SECONDS (50 Ohm LOAD)

| Storage Conditions | Anode Coatings | |
| --- | --- | --- |
| | 1 | 2 |
| Initial | 1.2 | 0.8 |
| 1 Day, 71° C. | <0.1 | <0.1 |
| 3 Days, 71° C. | 2.0 | 0.1 |
| 1 Week, 71° C. | 7.0 | 2.5 |
| 2 Weeks, 71° C. | >120 | >120 |
| 1 Week, 45° C. | 5.0 | 1 |
| 2 Weeks, 45° C. | 2.5 | 3 |

1: Two 15 sec. dips, EtOAc: CA, 3:1
2: Two 15 sec. dips, 1M LiClO₄, EtOAc: CA, 3:1

Uncoated lithium anodes soaked in electrolyte saturated wth LiClO₄ demonstrated an improvement in voltage delay as compared to similar anodes soaked in electrolyte to which no LiClO₄ had been added. It is also found that cyanoacrylate monomer is soluble in the electrolyte. Uncoated lithium anodes soaked in electrolyte containing dissolved monomer show an improvement in voltage delay but the monomer appears to react with the electrolyte and provides reduced efficacy over time.

The passivation effect on lithium electrodes appears to result from film formation on the lithium surface. The conditions leading to control of the film are obscure, but it is postulated that weaker films have a lesser tendency to passivate.

Alkyl 2-cyanoacrylates are unsaturated monomeric esters which polymerize at room temperature without added catalysts and which are used as adhesives. Polymerization is usually initiated by moisture present in the atmosphere. The compounds are described in the *Encyclopedia of Polymer Science and Technology*, John Wiley and Sons, 1964, Vol. 1, at pages 337 to 342.

In assembling cells in accordance with the invention, the separator is also coated with a cyanoacrylate film.

Analytical techniques including X-ray Fluorescence and Infra red spectroscopy have established that cyanoacrylate films cast from lithium perchlorate/ethyl acetate solution are not changed in chemical structure as compared to similar cast films produced without LiClO₄ but that the salt is added to the polymer matrix. Additionally, the LiClO₄-doped film is opaque while the undoped cyanoacrylate film is much more transparent.

It is found that LiClO₄ for use in accordance with the invention must be carefully dried to insure absence of water.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

What is claimed is:

1. The method for reducing passivation of a lithium electrode used in a cell having a thionyl chloride liquid cathode which comprises coating said lithium electrode before assembly into said cell with a solution of an alkyl 2-cyanoacrylate, a solvent and lithium perchlorate.

2. The method in accordance with claim 1 wherein lithium perchlorate is present in said solution in an effective concentration up to about 3 molar.

* * * * *